United States Patent Office 3,404,172
Patented Oct. 1, 1968

3,404,172
PREPARATION OF 2-CHLOROALKYL-
ISOTHIOCYANATES
Donald A. Tomalia, Midland, Mich., assignor to The Dow Chemical Company, Midland, Mich., a corporation of Delaware
No Drawing. Filed Nov. 29, 1965, Ser. No. 510,377
7 Claims. (Cl. 260—454)

The present invention relates to a novel process for the preparation of 2-chloroalkylisothiocyanates. More specifically, the present invention concerns the production of 2-chloroalkylisothiocyanates by the reaction of an aziridine with thiophosgene. The 2-chloroalkylisothiocyanates may be utilized in the preparation of vinylisothiocyanate monomer as disclosed in U.S. Patent 2,757,190.

It has now been discovered that 2-chloroalkylisothiocyanates can be prepared by the reaction of an aziridine with thiophosgene as represented by:

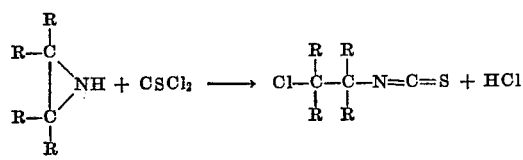

wherein at least one R is hydrogen and the other R groups are independently selected from hydrogen and one to four carbon alkyl groups. Similarly, two R groups on adjacent carbon atoms may represent the butylene radical,

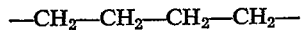

i.e. where the aziridine is 7-azabicyclo [4.1.0] heptane.

In the general method of the present invention, an aziridine is slowly brought into admixture with thiophosgene and the resulting reaction of these two components yields 2-chloroalkylisothiocyanate product. The aziridine and thiophosgene are preferably admixed in the presence of an organic solvent which is inert under the reaction conditions. A temperature of from about −10° C. to about 35° C. is maintained during the reaction with a temperature of 5° C. to 15° C. preferred. The aziridine solution is preferably added to the thiophosgene solution in a dropwise manner to avoid undesirable polymer formation which may occur to an appreciable extent, e.g. as a side reaction, at more rapid addition rates or upon addition of thiophosgene to the aziridine. A molar ratio of aziridine:thiophosgene of 1:1 is preferred, but a molecular excess of the thiophosgene can be used if desired. An increase in the relative amount of aziridine employed, however, usually results in a decreased yield of the desired product and in the formation of unwanted polymeric products.

Examples of aziridine starting materials which can be employed in the method of the present invention include aziridine, 2-methyl aziridine, 2,2'-(dimethyl)aziridine, 2,3(dimethyl)aziridine, 2,3(diethyl)aziridine, 2-propyl aziridine, 2-n-butyl aziridine, 2,3(di-n-butyl)aziridine and 7-azabicyclo [4.1.0] heptane.

The preferred solvent employed in the method of the present invention is chloroform. Other suitable inert solvents include hydrocarbons, chlorinated hydrocarbons, and ethers, e.g. benzene, hexane, methylene chloride, carbon tetrachloride, perchloroethylene, diethyl ether, and dioxane.

A variation of the above-described inventive method involves the addition of the aziridine starting material to thiophosgene in the presence of a tertiary amine acid acceptor to form a 1-aziridine thiocarbonyl chloride which undergoes rearrangement to form the corresponding 2-chloroalkylisothiocyanate. This procedure may be represented, for example, by the following reaction of ethylenimine and thiophosgene:

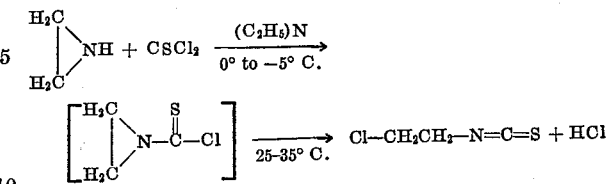

A reaction temperature of from about −15° to about +5° C. is employed to form the unstable thiocarbonyl chloride and the temperature is then preferably raised to between about 25° and about 35° C. to facilitate rearrangement to the desired isothiocyanate product. Polymer formation becomes a problem at temperatures above 5° C. during formation of the thiocarbonyl chloride and above 35° C. during rearrangement to the isocyanate. Use of an inert solvent, as defined above, in which the acid acceptor salt is insoluble is advantageous in order to obtain improved yields of the desired product.

Useful acid acceptors are tertiary amines such as, for example, pyridine and triethylamine.

The following examples are illustrative of the present inventive method, but are not to be interpreted as limitative.

Example 1

A quantity of 14 grams (0.122 mole) of thiophosgene was dissolved in 125 ml. of dry chloroform and charged into a 500 ml., three-necked round bottomed flask equipped with a reflux condenser, stirrer and addition funnel. This solution was cooled to 0° C. and stirred vigorously while 4.3 grams (0.1 mole) of aziridine dissolved in 100 ml. of dry chloroform was added in a dropwise manner over a period of one hour. The ensuing reaction mixture was maintained between 0° C. and 5° C. during this addition. After completion of the aziridine addition, the temperature of the homogeneous reaction mixture was slowly raised to about 25° C. which resulted in crystallization of a hygroscopic solid material. This material was filtered off in a nitrogen-filled dry box and subsequently identified as 2-chloroethylamine hydrochloride. The filtrate was reduced to an amber colored oil by distilling off the chloroform at atmospheric pressure. This crude oil product was distilled under reduced pressure through a 45 cm. by .8 cm. semi-micro Vigreux column and yielded 6.30 gram (52 percent theoretical yield) of a water-white liquid having a boiling point of 58–60° C. at 6 mm. Hg pressure. Elemental analysis of this product (2-chloroethylisothiocyanate) yielded 12.55 weight percent nitrogen as compared to the calculated value for nitrogen in $C_3H_4ClNS$ of 12.33. Nuclear magnetic resonance and infrared spectra studies confirmed the product structure.

Example 2

A mixture of 4.3 g. (0.1 mole) of aziridine and 10.1 g. (0.1 mole) of triethylamine was dissolved in 100 ml. of chloroform and the solution added dropwise over a period of 65 min. to 11.5 g. (0.1 mole) of thiophosgene dissolved in 125 ml. of chloroform contained in a 500 ml., three-necked, round-bottom flask equipped with a condenser, a stirrer and an addition funnel. The thiophosgene-chloroform solution was maintained at a temperature of about −2° C. to 3° C. during the addition of the aziridine-triethylamine-chloroform solution. The reaction mixture changed from a deep orange color to a pale yellow color during the addition period, but no amine hydrochloride precipitate was observed. The reaction mixture was allowed to warm up to about 25° C. and kept at that temperature for about 16 hours. During this time the pale yellow color remained constant. Approximately 200 ml. of n-hexane were then added to the reaction flask to precipitate the amine salt. Partial removal of hexane and chloroform by distillation at atmospheric pressure resulted in the formation of an orange oil which separated from the remaining hexane. The hexane was decanted from this heavier oil and evaporated to yield a pale yellow oil. The two oil portions were combined and represented 9.25 g. of crude product. Distillation of these oil fractions, under vacuum, through an 45 cm. x .8 cm. semi-micro Vigreux column gave 5.8 g. (47.8 percent of theoretical yield) of 2-chloroethylisothiocyanate as a pale yellow oil boiling at 98–101° C. at 13 mm. Hg pressure. The infrared spectrum of this material was identical to that of the 2-chloroethylisothiocyanate product of Example 1.

Example 3

Using the same type of equipment as in the preceding examples, a quantity of 5.7 g. (0.1 mole) of 2-methyl aziridine dissolved in 100 ml. of chloroform was added dropwise over a period of one hour to a solution of 14 g. (0.122 mole) of thiophosgene dissolved in 125 ml. of dry chloroform which had been cooled to 0° C. The temperature of the reaction, resulting from the addition of the 2-methyl aziridine to the thiophosgene, was maintained at between about 0 to 5° C. by external cooling. The reaction mixture remained a homogenous reddish-orange color throughout the addition period. Chloroform was removed by distillation at atmospheric pressure and partial precipitation of chloropropylamine hydrochloride occurred. Addition of 20 ml. of n-hexane caused the remainder of the chloropropylamine hydrochloride to precipitate and the amine salt was then filtered off in a nitrogen-filled dry box. The filtrate was distilled at atmospheric pressure to remove the n-hexane leaving 7.53 g. (55.5 wt. percent of theoretical yield) of crude 2-chloropropylisothiocyanate product. Distillation of this crude product yielded 6.72 g. (49.6 percent theoretical yield) of a water-clear liquid boiling at 52–54° C. at 4 mm. Hg pressure. The product was identified as being 2-chloropropylisothiocyanate both by infrared analysis and by an elemental analysis which gave a nitrogen content of 9.89 percent as compared to a calculated content of 10.04 percent nitrogen for $C_4H_6ClNS$.

In a precedure similar to that of Example 2 2-methyl aziridine was reacted with thiophosgene in the presence of triethylamine to form 1-(2-methylaziridine) thiocarbonyl chloride which underwent rearrangement upon temperature elevation to give a 49.5 percent yield of the desired 2-chloropropylisothiocyanate product.

Example 4

A 500 ml. three-necked flask equipped with a condenser, stirrer and addition funnel was charged with 11.5 g. (0.1 mole) of thiophosgene dissolved in 125 ml. of chloroform and cooled to about 0° C. The temperature was maintained at from about 0 to 5° C. while a solution of 9.62 g. (0.1 mole) of 7-azabicyclo [4.1.0.] heptane in 75 ml. of chloroform was added to the flask in a dropwise manner, with stirring, over a period of one hour. The initially developed deep orange color of the reaction mixture changed to a pale yellow color upon allowing the mixture to stand overnight at approximately 25° C. This color change was accompanied by precipitation of a white, insoluble solid which was filtered off in a nitrogen-filled dry box and indentified as D,L-trans-2-chlorocyclohexylamine hydrochloride. The filtrate was distilled to remove chloroform and the remainder was treated with 25 ml. of n-hexane to complete precipitation of a brown crystalline material leaving a light colored solution. This mixture was filtered and the filtrate was distilled at atmospheric pressure to remove the n-hexane leaving a yellow to amber colored oil which was then distilled under vacuum through an .8 cm. by 45 cm. semi-micro Vigreux column. The pale yellow distillate obtained had a boiling range of 25–68° C. at 1 mm. pressure. A sample of this product was analyzed by vapor phase chromatography which showed the sample to contain 95.9 percent of a major component. A further distillation of the pale yellow distillate gave 8.77 g. (49.9 percent of theoretical yield) of a pale yellow oil boiling at 118–119° C. at 8 mm. Hg pressure. Infrared analysis confirmed the structure as consistent with that of D,L-trans-2-chlorocyclohexyl isothiocyanate. Elemental analysis showed 7.82 percent nitrogen and 20.19 percent chlorine as compared with the calculated values of 7.97 percent nitrogen and 20.18 percent chlorine.

In a manner similar to the foregoing examples, 2,2'(dimethyl)aziridine, 2,3(dimethyl)aziridine, 2,3(diethyl) aziridine, 2-propyl aziridine 2-n-butyl aziridine and 2,3 (di-n-butyl)aziridine are reacted with thiophosgene to give the corresponding 2-methyl-2-chloropropyl isothiocyanate, 1-methyl-2-chloropropyl isothiocyanate, 1-ethyl-2-chlorobutyl isothiocyanate, 2-chloropentyl isothiocyanate, 2-chlorohexyl isothiocyanate and 1(n-butyl)-2-chlorohexyl isothiocyanate, respectively.

I claim:

1. A method for the preparation of 2-chloroalkylisothiocyanate which comprises admixing an aziridine with thiophosgene at a reaction temperature between about −10 and 35° C. and recovering 2-chloroalkylisothiocyanate from the reaction mixture.

2. A method for the preparation of 2-chloroalkylisothiocyanate which comprises adding an aziridine to thiophosgene, in the presence of an acid acceptor and an inert organic solvent, at a reaction temperature between about −15 and 5° C. and thereafter raising the temperature of the reaction mixture to between about 25 and 35° C. and recovering 2-chloroalkylisothiocyanate from the reaction mixture.

3. The method of claim 1 wherein the aziridine and thiophosgene are admixed in the presence of an inert organic solvent.

4. The method of claim 1 wherein the aziridine is ethylenimine.

5. The method of claim 1 wherein the aziridine is 2-methyl aziridine.

6. The method of claim 1 wherein the aziridine is 7-azabicyclo [4.1.0.] heptane.

7. The method of claim 2 wherein the aziridine is ethylenimine and the acid acceptor is triethylamine.

References Cited

UNITED STATES PATENTS 2,754,190   7/1956   Jones et al. _____ 260—454

OTHER REFERENCES

Jones et. al. (II): J. Organic chem., pp. 125–47, 126–7 relied upon (1944).

CHARLES B. PARKER, Primary Examiner.

D. H. TORRENCE, Assistant Examiner.